Figure 3:
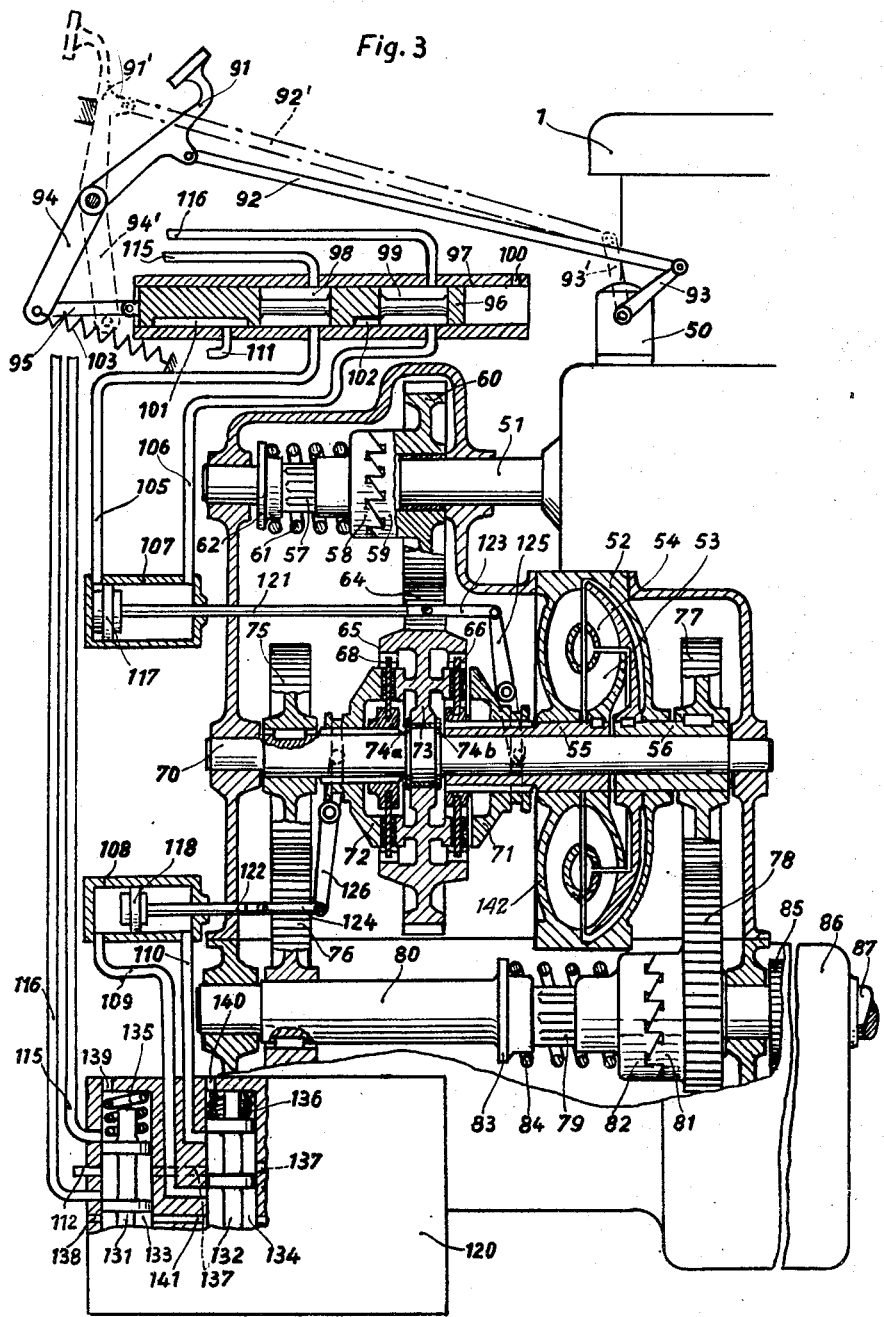

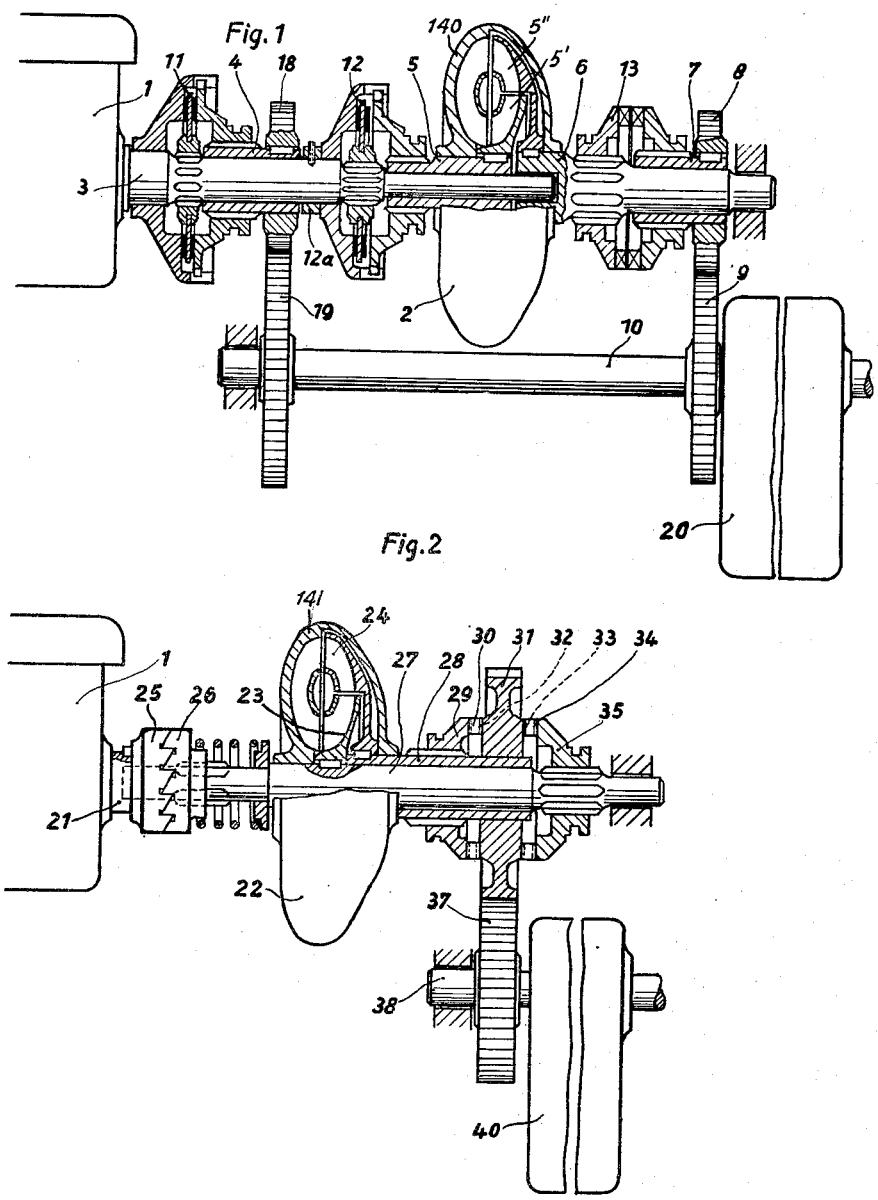

Nov. 2, 1954 — K. MAYBACH — 2,693,120
MIXED VEHICLE DRIVE
Filed Dec. 28, 1949 — 3 Sheets-Sheet 2

Inventor
Karl Maybach
by Karl Michaelis, atty.

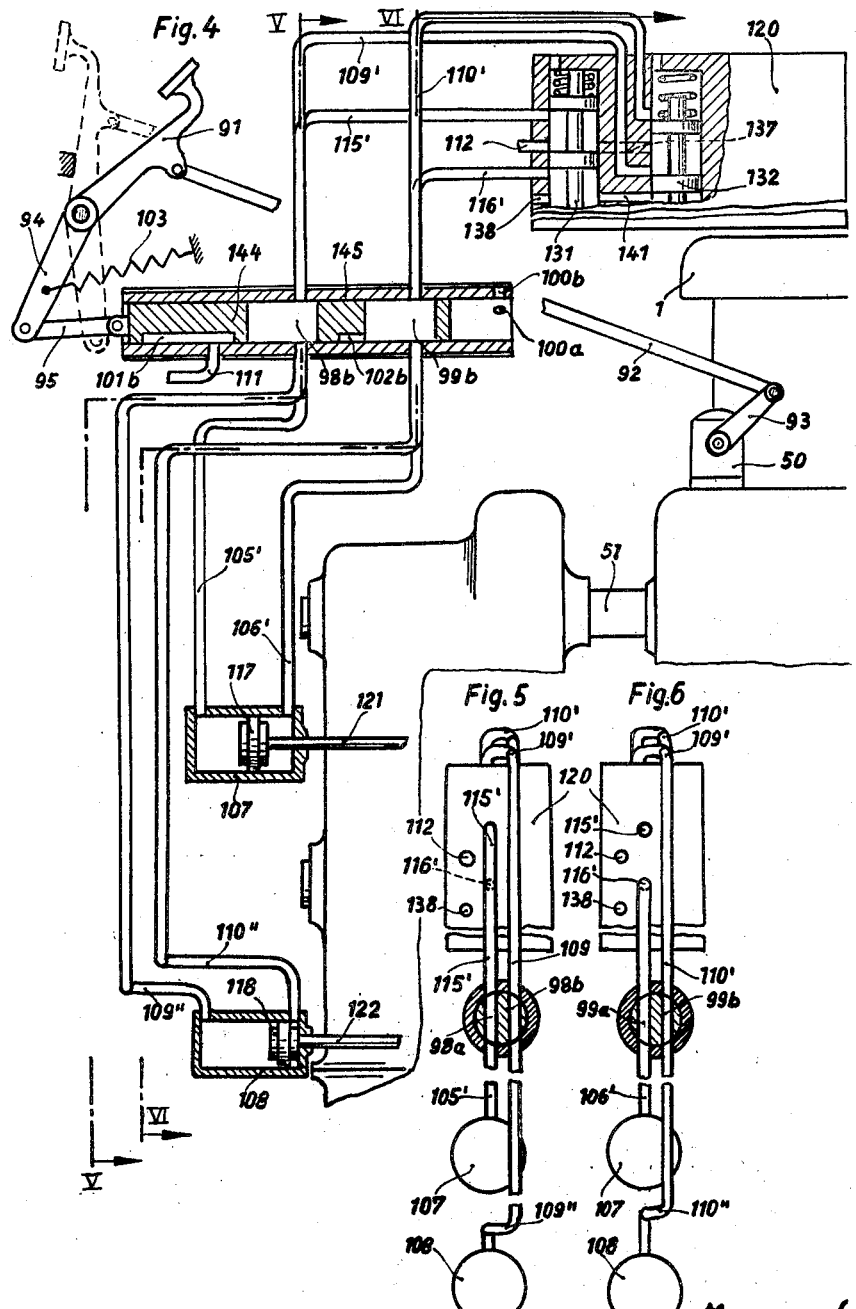

United States Patent Office 2,693,120
Patented Nov. 2, 1954

2,693,120

MIXED VEHICLE DRIVE

Karl Maybach, Friedrichshafen (Bodensee), Germany, assignor to Maybach-Motorenbau G. m. b. H., Friedrichshafen, Germany, a firm of Germany Application December 28, 1949, Serial No. 135,405

Claims priority, application Germany December 30, 1948

3 Claims. (Cl. 74—655)

This invention concerns a braking arrangement for a power vehicle having a power transmission comprising at least one hydraulic power transmitting device and a change speed gear driven by the hydraulic power transmitting device. The change speed gear is used together with the hydraulic power transmitting device, or, if necessary for certain gears, without it.

The invention offers special advantages for omnibuses driven by internal combustion engines, and vehicles with similar driving conditions, in which relatively high vehicle weight, large revolving masses, high and greatly varying travel resistances and speeds of travel occur.

According to the present invention the hydraulic action of the hydraulic power transmitting device is applied in a particularly efficient manner to the slowing down (braking) action by providing a coupling such that on braking, the pump wheel of the hydraulic power transmitting device is driven by the vehicle wheels.

The hydraulic action of hydraulic power transmitting devices to brake vehicles has already been used in a manner in which the normal driving conditions are maintained, so that the turbine wheel is driven by the vehicle. The slowing down (braking) action is only relatively small, however. Constructions are also known in which, for example, the guide apparatus of the hydraulic power transmitting device is connected with the driven shaft and the driving rotor and driven rotor are held fast so that the driven shaft is braked. This demands a specially developed apparatus, in particular for the guide apparatus of the hydraulic power transmitting device. In power transmissions without interposed gear wheel transmissions, in which a free wheel coupling was provided in the hydraulic power transmitting device between the driven rotor and the driving rotor, a specially formed blading of the driven rotor has already been used such that the racing speed of the driven rotor is below the speed of rotation of the driving rotor, and thus a braking effect is produced by the load taken up by the pump wheel after automatic connection of the latter to the vehicle wheels.

In the arrangement according to the invention, no alterations of the hydraulic transmission are made and the individual bladings function normally also for braking. There is only a simple arrangement required to connect the driving rotor of the hydraulic power transmitting device to the vehicle wheels. In many cases such a connection is already provided for other purposes.

For example in a power transmission wherein the hydraulic power transmitting device is continuously kept filled and wherein, on travel in mechanical gears the hydraulic power transmitting device is disconnected by clutches provided before and after the hydraulic power transmitting device, on braking during travel with the mechanical drive, a clutch is arranged in the drive of the driving rotor which clutch is engaged for braking by the mechanical transmission when the vehicle is in motion.

For braking during travel with drive through the hydraulic power transmitting device, according to the invention (with this embodiment and also in others) a clutch provided behind the driven rotor of the hydraulic power transmitting device is disengaged and the clutch provided for travel with the purely mechanical drive is engaged. This will be fully described later.

With a power transmission with a locking clutch for the hydraulic power transmitting device, the clutch arranged after the driven rotor is disengaged by means of the braking arrangement according to the invention, during travel with driven and driving rotors locked to one another. If, with this arrangement, operation is effected with drive through the hydraulic power transmitting device, the clutch arranged after the hydraulic power transmitting device is disengaged and the locking clutch is engaged to effect braking.

If the hydraulic braking action suffices without bringing the engine into the braking action, a free wheel arrangement can be provided between the engine and the power transmission. Also, in a further development of the invention the coupling behind the driven wheel of the hydraulic power transmitting device can be constructed as a free wheel arrangement.

The invention will be further described by way of example with reference to the accompanying drawings which show several embodiments of the invention diagrammatically and in which:

Figs. 1 and 2 show two different embodiments of power transmissions comprising internal combustion engines, hydraulic torque converters and clutches and using arrangements according to the invention.

Fig. 3 and also Figs. 4–6 show in greater detail two further examples of construction, the gear change cylinders and the regulating parts also being shown. Figs. 5 and 6 are sections along the lines V—V, VI—VI respectively in Fig. 4.

In Fig. 1, 1 is an internal combustion engine, 2 a hydraulic power transmitting device in the form of a turbo converter having a stationary part 140, 3 the shaft driven by the internal combustion engine 1 on which shaft a friction clutch 11 is provided for connecting the shaft 3 and a hollow shaft 4. 5 is the shaft connected with the driving rotor 5' of the hydraulic power transmitting device, 6 is a shaft connected with the driven rotor 5'' of the hydraulic power transmitting device, 7 is a hollow shaft piece on which a gear wheel 8 is fitted, which engages a gear wheel 9 on a shaft 10 driving a change speed gear 20. 12 is a friction clutch to connect the shafts 3 and 5, 12a is a setting ring on the shaft 3, 13 designates a claw clutch to connect the shafts 6 and 7, 18 is a gear wheel, connected with the displaceable half of the clutch 11 through the hollow shaft 4. This gear wheel 18 meshes with a wheel 19 fitted tightly on the shaft 10.

In Fig. 2, 22 is a hydraulic power transmitting device, the driving rotor 23 of which is keyed to a shaft 27, which is driven by the shaft 21 of an internal combustion engine 1, through a free wheel coupling 25, 26. 24 is a driven rotor of the hydraulic power transmitting device 22, which driven rotor is keyed on to a hollow shaft 28 on the other end of which the displaceable half 29 of a claw clutch is arranged, the claws 30 of which co-operate with claws 32 arranged on a gear wheel 31. Numeral 140 designates the stationary member of the fluid drive device 22. 33 are claws on the other side of the gear wheel 31, which cooperate with claws 34 of a coupling half 35 displaceable on the shaft 27. 37 is a gear wheel on a shaft 38 driving the vehicle wheels through a change speed gear 40.

In Fig. 3, 50 is the fuel pump of the internal combustion engine 1. 51 is the shaft driven by the latter, 52 is a hydraulic power transmitting device with a driving rotor 53 and a driven rotor 54. Numeral 142 designates stationary member of the hydraulic power transmitting device. The driving rotor is mounted on a hollow shaft 55, the driven rotor is keyed to a hollow shaft 56. 57 are splines on the shaft 51, on which part 58 of a free wheel clutch is displaceable. The other part 59 of the free wheel clutch is connected rigidly to a gear wheel 60. The clutch part 58 is acted upon by a spring 61 which bears against a disc 62 rigidly mounted on the shaft 51. 64 is a gear wheel meshing with gear wheel 60. The gear wheel 64 supports a clutch part 65, which co-operates with friction discs 66 and 68. 70 is a solid shaft extending through the hollow shafts 55 and 56. 71 and 72 are the displaceable clutch members of the two friction clutches co-operating with the clutch piece 65. The gear wheel 64 or rather the clutch piece 65 is mounted on the shaft 70 by a hub piece 73 between rings 74a and 74b. 75 is a gear wheel keyed on the shaft 70, which gear wheel meshes with a gear wheel 76 keyed to a shaft 80. 77 is a gear wheel keyed on to the hollow shaft 56, which meshes with a gear wheel 78 to which one part 81 of a free wheel clutch is fastened. The other part 82 of this clutch is arranged displaceably on splines 79 of the shaft 80 and is acted upon by a spring 84 bearing against a collar 83 on the shaft 80. 85 is the first gear wheel of a change speed gear 86 which is fastened on the shaft 80. 87 is the shaft emerging from the gear 86 through which shaft the vehicle wheels are driven.

91 is a foot lever, which is connected through a rod 92 with a lever 93 arranged on the regulating shaft of the fuel pump 50. 94 is a lever connected with the lever 91, to which lever 94 the rod 95 of a slide valve 96 is pivoted. The slide valve 96 is arranged slidably in a housing 97. 91', 92', 93', 94' are the positions of the parts 91–94 in the rest position of the foot lever 91. 98 and 99 are annular cavities and 101 and 102 are axial grooves on the valve 91. 100 is a connection opening, 103 is a traction spring for the lever 94.

105 and 106 are pipes between the valve casing 97 and a cylinder 107. A further cylinder 108 is connected through pipes 109 and 110 with a regulating housing 120. 111 and 112 are pressure oil supply pipes, 115 and 116 are pipes connecting the slide valve housing 97 and the regulating housing 120. 117 and 118 are pistons in the cylinders 107 and 108, respectively, piston 117 having a rod 121 whose free end is pivoted to a link 123, and piston 118 having a rod whose free end is pivoted to a link 124. 125 and 126 are double armed levers which are pivoted to the links 123 and 124 and the coupling sleeves 71 and 72, respectively. In the regulating housing 120 two slide valves 131 and 132 are arranged in bores 133 and 134, displaceable in these bores against the pressure of springs 135 and 136 through a regulating roller (not shown), which is actuated by an automatic apparatus, not shown. 137 are connecting passages in the housing 120 for conducting oil supplied through the pipe 112. 138, 139, 140 are openings communicating with the outside; 141 is a passage connecting bores 133, 134 in the regulating housing 120.

In Figs. 4, 5 and 6, 144 is a slide valve similar to the slide valve 96 of Fig. 3. This slide valve 144 is displaceable in a housing 145 and has passages 98a, 98b, 99a, 99b and grooves 101b and 102b. In the housing 145 openings 100a and 100b are provided in the plane of the passages 98a and 99a and in the plane of passages 98b and 99b, respectively. In the plane of the passages 98a and 99a are grooves 101a and 102a corresponding to grooves 101b and 102b in the plane of the passages 98b and 99b. The grooves 101a and 102a, however, are not visible in the figures. The pipes 105', 106', 115', 116' correspond to the pipes 105, 106, 115, 116 of Fig. 3 and form, with the slide valve 144 the connection between the regulating housing 120 and the cylinder 107. The regulating housing 120 is also connected through pipes 109' and 110' with the slide valve casing 145, the cylinder 108 being connected with the slide valve casing 145 by the pipes 109'', 110''.

In the modification shown in Fig. 1 the drive is effected in mechanical gears from the internal combustion engine 1 through the shaft 3, the clutch 11, the gear wheels 18, 19 and the shaft 10 on to the vehicle wheels. The clutches 12, 13 are disengaged and the fluid drive 2 stands still since both the driving rotor and the driven rotor are disconnected from the transmission. The gear wheels 8 and 9 and the shaft 7 run freely. If the driver, during travel, wishes to use the hydraulic transmission for braking while driving in a mechanical gear, he engages the clutch 12 so that the driving rotor of the hydraulic power transmitting device is driven by the vehicle through the shaft 10 and the gear wheels 19, 18, the clutch 11, the shaft 3 and the clutch 12. The power hydraulically transmitted to the driven rotor effectively brakes the vehicle. Since the coupling 11 is engaged, the engine also partakes in the braking effort. With other arrangements, for example those shown in Figs. 2 and 3, it is possible to disconnect the engine from the driving rotor drive during the braking.

In the arrangement of Fig. 1, during travel in the hydraulic gear, the drive is effected through the hydraulic power transmitting device from the shaft 3 through the clutch 12 on to the driving rotor shaft 5 and further through the driven rotor shaft 6, through the clutch 13 on to the shaft 7 and through the gear wheels 8 and 9 to the shaft 10. The clutch 11 is thereby disconnected. If the driver during travel in the hydraulic gear wishes to use the hydraulic power transmitting device for braking he disconnects the clutch 13 and simultaneously engages the clutch 11. Thereby the driving rotor of the hydraulic power transmitting device is driven from the shaft 10 through the wheels 19, 18, the shaft 3 and the clutch 12, and braking action is obtained by transmission of the brake load to the driven rotor of the hydraulic power transmitting device.

In the construction shown in Fig. 2 the drive is effected (in the hydraulic gear) from the internal combustion engine 20 through the shaft 21, the free wheel clutch 25, 26, the shaft 27 on to the driving rotor 23 and hydraulically on to the driven rotor 24. From the latter the drive goes through the hollow shaft 28, the clutch 30, 32, the gear wheels 31 and 37 to the shaft 38. Thus, when driving in the hydraulic gear, the clutch 33, 34 is cut out.

When driving in mechanical gears, the internal combustion engine 20 drives through the shaft 21 the free wheel coupling 25, 26 and the driving rotor 23. The clutches 30, 32 and 33, 34 are both engaged. Thereby, the shafts 27 and 28 and thus the driving rotor and the driven rotor of the hydraulic power transmitting device are locked with one another and no load is transmitted hydraulically. The drive is purely mechanically transmitted from the shaft 27 through the gear wheels 31 and 37 on to the shaft 38.

If during travel in hydraulic gear the hydraulic power transmitting device is to be used for braking, the clutch 30, 32 must be disengaged and the clutch 33, 34 engaged. Thereby the driving rotor 23 is driven from the shaft 38 through gear wheels 37, 30, clutch 33, 34 and shaft 27, and the hydraulic braking action obtained in the hydraulic power transmitting device. The internal combustion engine 1 is prevented by the free wheel clutch 25, 26 from taking part in the braking action.

On travel in mechanical gears the clutch 30, 32 is disengaged to obtain a braking action in the hydraulic power transmitting device. In this case, the driving rotor 23 of the hydraulic power transmitting device is driven by the shaft 38 through the wheels 37, 31, the clutch 33, 34, and the shaft 27, and in this manner again the hydraulic braking action is obtained.

In the embodiment shown in Fig. 3 the individual parts of the regulation and the transmission are shown in the positions corresponding to about 75% of full travel of the lever 91 from its rest position (shown dotted). The control shaft of the fuel pump 50 is brought into the corresponding position by the rod 92 and the lever 93. At the same time the lever 94 connected with the foot lever 91 is moved out of the dotted position 94' into the position shown in full lines, and therewith the slide valve 96 is moved towards the left into the position shown in the figure by the link 95. During this displacement the pipes 105, 106 are connected with the pipes 115 and 116 through the cavities 98 and 99 of the slide valve 96. In the control housing 120 the slide valve 131 has been displaced into the position shown and the slide valve 132 has been moved into the upper position shown, by means of an automatic apparatus (not shown). Thereby the pipe 115 is connected with the outside by the opening 139; since the pipe 105 is connected to the pipe 115, the space to the left of the piston 117 in the cylinder 107 is without pressure. Pressure oil is supplied to the space on the right of the piston 117 in the cylinder 107 through pipe 112, pipe 116 and pipe 106. The piston 117 is thus brought into the left end position shown. Thereby the coupling sleeve 71 is displaced towards the right, by the rods 121 and 123 through the lever 125, and the couplings 65, 66, 71 is disengaged. The pipe 109 is connected with the outside through the opening 138 through the passage 141 so that the space to the left of the piston 118 in the cylinder 108 is without pressure. The space of the cylinder 108 to the right of the piston 118 is connected through the pipe 110 and the passage 137 with the pipe 112. It obtains thereby pressure so that the piston 118 is moved so far to the left that the friction couplings 65, 68, 72 is engaged. If the driver reciprocates the foot lever 91, nothing of the above described adjustment of the coupling will be altered.

By the described adjustment of the regulation, the power transmission is effected (in the mechanical gear) from the internal combustion engine 1 through the shaft 51, the gear wheels 60, 64, the clutch 65, 68, 72, the shaft 70, the gear wheels 75, 76, the shaft 80, and the change speed gear 86, on to the shaft 87. The hydraulic power transmitting device 52 is inoperative since the couplings 65, 66, 71 is disengaged and the driving rotor 53 is not driven and the driven rotor 54 stands still also because drive from the shaft 80 through the wheels 78, 77 is prevented by the free wheel apparatus 81, 82.

In place of the automatically engaging and disengaging free wheel apparatus, there could be provided an arbitrarily operative clutch, or a clutch operated by an automatic apparatus of any construction.

If the foot lever 91 is released by the driver into the position shown in dotted lines 91', the slide valve 96 is carried so far to the right that on the last part of this motion the openings of the pipes 115 and 116 are closed and the pipe 105 is connected by the groove 101 with the pressure supply pipe 111. The pipe 106 is similarly connected by the groove 102 and the cut away portion 99 with the opening 100. Through the pipe 105 the space of the cylinder 107, left of the piston 117, now receives pressure oil whilst the space to the right of the piston 117 is without pressure. Thereby the clutch 65, 66, 71 is engaged, the clutch 65, 68, 72 remaining in the engaged position.

Since with the release of the foot lever 91 into the position 91' the regulating shaft of the fuel pump 50 is adjusted for idling, no power is transmitted from the internal combustion engine to the shaft 87, and the shaft 87 is driven by the vehicle. The driving rotor 53 of the fluid drive 52 is thus driven from the shaft 87 through the change speed gear 86, the shaft 80, the gear wheels 76, 77, the shaft 70, the clutches 65, 68, 72, and 65, 66, 71 and the hollow shaft 55. Thereby power is hydraulically transmitted to the driven rotor, and a corresponding high speed is obtained braking the vehicle.

As soon as the driver again moves the foot lever 91 out of the position 91' and after the opening 100 has been closed by the end portion of the slide valve 96, the connection between the pipes 106 and 116 is again established by the left hand edge of the cut away portion 99. The piston 117 thus passes under the influence of the pressure oil supply through the passages 112, 116, 99, 106, acting against its right side, into its left end position and disengages the clutch 65, 66, 71. The transmission is effected, after the fuel pump 50 has been again adjusted for a large output, so that the vehicle is again driven from the internal combustion engine through the shaft 51, the gear wheels 60, 64, the clutch 65, 68, 72, the shaft 70, the gear wheels 75, 76, the shaft 80, the change speed gear 86 on to the shaft 87. The hydraulic power transmitting device is again excluded from the transmission by the disengagement of coupling 65, 66, 71 and the free wheel device 81, 82.

In the form of construction shown in Figs. 4, 5 and 6 the arrangement of the power transmission from the engine up to the change speed gear is the same as that of Fig. 3. The regulation differs from that of the example of Fig. 3 insofar as the slide valve 144 not only regulates the piston 117 in the cylinder 107 by way of the pipes 105' and 106' (as does the slide valve 96 in Fig. 3) but also at the same time regulates the piston 118 in the cylinder 108 (through pipes 109" and 110").

In the construction of Figs. 4, 5 and 6 during travel in mechanical or hydraulic gear, if the driver withdraws the foot lever 91 from the position shown in full lines into the dotted position 91', and thereby adjusts the fuel pump 50 to idling, the pressure supply to the cylinder 107 is regulated through the passages 98a and 99a in similar manner to Fig. 3. Pressure is thus applied on the left side of the piston 117, and this is moved towards the right, engaging the clutch 65, 66, 71. If the vehicle was operated previously in a mechanical gear, the driving rotor of the torque converter is connected on, as described above, and the driven rotor hydraulically destroys the braking forces.

At the same time, however, in the dotted position 91' of the foot lever 91, pressure is supplied to the pipe 110" and to the right of the piston 118, so that the clutch 65, 68, 72 is engaged. If the engine was running previously in the mechanical gear, this coupling was already engaged. If, however, at the time of the release of the foot lever 91 to the dotted position 91' the vehicle was running in the hydraulic gear and thus the clutch 65, 66, 71 was engaged and the clutch 65, 68, 72 was disengaged (in the position shown in Fig. 4) the latter clutch is now also engaged and the driving rotor of the hydraulic power transmitting device is driven from the shaft 87, through the shaft 80, the gear wheels 76, 75, and the clutches 65, 68, 72 and 65, 66, 71.

The connection of the driven rotor 54 with the shaft 80 is automatically released by the free wheel device 81, 82 during braking.

I claim:
1. A mixed vehicle drive comprising, in combination, an internal combustion engine, a drive shaft connectable with said engine, a mechanical change speed gear, a hydraulic power transmission, clutch means for selectively connecting said change speed gear either mechanically or by means of said hydraulic power transmission with said drive shaft, said hydraulic power transmission having a driving rotor and a driven rotor, said clutch means being adapted to connect said change speed gear with said driving rotor and to disconnect said driven rotor from said change speed gear, and an additional clutch for disconnecting said drive shaft from said engine.

2. A mixed vehicle drive comprising, in combination, an internal combustion engine having a drive shaft, a mechanical change speed gear, a mechanical power transmission, a hydraulic power transmission having a driving rotor and a driven rotor, and clutch means for selectively connecting said change speed gear with said drive shaft either by means of said mechanical power transmission or by means of said hydraulic power transmission, said clutch means including means for connecting said change speed gear with said driving rotor and for disconnecting said change speed gear from said driven rotor, and an additional clutch for disconnecting said mechanical power transmission as well as said hydraulic power transmission from said drive shaft.

3. A mixed vehicle drive comprising, in combination, an internal combustion engine having a drive shaft, a mechanical change speed gear, mechanical power transmitting means interposed between said drive shaft and said change speed gear, a first clutch interposed in said mechanical power transmitting means, a hydraulic power transmitting device having a driving rotor and a driven rotor, a second clutch interposed between said drive shaft and said driving rotor, a third clutch interposed between said driven rotor and said change speed gear, and means for engaging said first and said second clutch for driving said driving rotor by said change speed gear to produce a brake effect by said hydraulic power transmitting device.

References Cited in the file of this patent

UNITED STATES PATENTS

| Number | Name | Date |
|---|---|---|
| 1,900,119 | Lysholm et al. | Mar. 7, 1933 |
| 2,170,649 | Banker | Aug. 22, 1939 |
| 2,241,764 | Bollinger | May 13, 1941 |
| 2,258,684 | Lysholm et al. | Oct. 14, 1941 |
| 2,449,586 | Carnagua | Sept. 21, 1948 |
| 2,449,608 | Le May | Sept. 21, 1948 |